(12) United States Patent
Goldstein et al.

(10) Patent No.: US 11,373,064 B2
(45) Date of Patent: Jun. 28, 2022

(54) CROSS-MODALITY AUTOMATIC TARGET RECOGNITION

(71) Applicant: Raytheon Company, Waltham, MA (US)

(72) Inventors: Jonathan Goldstein, Fredericksburg, VA (US); Shane A. Zabel, Dallas, TX (US)

(73) Assignee: Raytheon Company, Waltham, MA (US)

(*) Notice: Subject to any disclaimer, the term of this patent is extended or adjusted under 35 U.S.C. 154(b) by 408 days.

(21) Appl. No.: 16/518,728

(22) Filed: Jul. 22, 2019

(65) Prior Publication Data

US 2021/0027113 A1    Jan. 28, 2021

(51) Int. Cl.
*G06K 9/00* (2022.01)
*G06K 9/62* (2022.01)
(Continued)

(52) U.S. Cl.
CPC ......... *G06K 9/6267* (2013.01); *G06K 9/6256* (2013.01); *G06K 9/6289* (2013.01); *G01S 13/9027* (2019.05); *G01S 15/89* (2013.01)

(58) Field of Classification Search
CPC ........ G06N 3/0454; G06N 3/08; G06N 3/088; G06N 3/0472; G06N 3/084; G06N 20/00; G06N 3/0445; G06N 3/04; G06N 7/005; G06N 3/082; G06N 20/20; G06N 20/10; G06N 3/02; G06N 5/003; G06N 3/0481; G06N 3/063; G06N 3/105; G06N 5/04; G06N 5/046; G06T 2207/20084; G06T 2207/20081; G06T 7/11; G06T 2207/10024; G06T 2207/10028; G06T 17/20; G06T 19/20
See application file for complete search history.

(56) References Cited

U.S. PATENT DOCUMENTS

2019/0130253 A1* 5/2019 Schultz ................. D03D 15/43
2019/0318474 A1   10/2019 Han
(Continued)

FOREIGN PATENT DOCUMENTS

| WO | WO-2021015840 A1 | 1/2021 |
| WO | WO-2021016352 A1 | 1/2021 |
| WO | WO-2021016358 A1 | 1/2021 |

OTHER PUBLICATIONS

Chen, "Multi-layer fusion techniques using a CNN for multispectral pedestrian detection," 2018, The Institute of Engineering and Technology Journal (Year: 2018).*
(Continued)

*Primary Examiner* — Alex Kok S Liew
(74) *Attorney, Agent, or Firm* — Schwegman Lundberg & Woessner, P.A.

(57) ABSTRACT

Discussed herein are systems, devices, and methods for automatic target recognition based on a non-visible input image. A method can include providing, as input to a first machine learning (ML) model for object classification, pixel data of a non-visible image, the first ML model including an encoder from a second ML model, the second ML model trained to generate a visible image representation of an input non-visible image, and receiving, from the first ML model, data indicating one or more objects present in the non-visible image.

20 Claims, 6 Drawing Sheets

(51) Int. Cl.
   *G01S 13/90*   (2006.01)
   *G01S 15/89*   (2006.01)

(56) References Cited

U.S. PATENT DOCUMENTS

2021/0027207 A1   1/2021  Bongio Karrman et al.
2021/0027417 A1   1/2021  Bongio Karrman et al.

OTHER PUBLICATIONS

Huang et al., "Automatic Classification of Retinal Optical Coherence Tomography Images With Layer Guided Convolutional Neural Network," Jul. 2019, IEEE Signal Processing Letters, vol. 26, No. 7 (Year: 2019).*

U.S. Appl. No. 16/935,646, filed Jul. 22, 2020, Cross-Modality Image Generation.

Forget, Yann, et al., "Fusion Scheme for Automatic and Large-Scaled Built-up Mapping", IEEE. IGARSS, (2018), 2072-2075.

Jain, V, et al., "A Multi-Sensor Fusion Framework in 3D", IEEE Conference on Computer Vision and Pattern Recognition Workshops., (2013), 6 pgs.

Kim, Kyoung Soo, et al., "Robust Multi-Sensor Image Registration by Enhancing Statistical Correlation", 7th International Conference on Information Fusion (FUSION), (2005), 380-386.

Lavely, Eugene, et al., "Model-based, multi-sensor fusion and bundle adjustment for image registration and target recognition", Algorithms for Synthetic Aperture Radar Imagery XIII, Proc. SPIE 6237, 62370R, (2006), 1-13.

Li, Y, "Multimodal Image Registration with Line Segments by Selective Search", IEEE Transactions on Cybernetics, vol. 47, No. 5, (May 2017), 1285-1298.

Mahjourian, Reza, et al., "Unsupervised Learning of Depth and Ego-Motion from Monocular Video Using 3D Geometric Constraints", arXiv:1802.05522v2 [cs.CV], (2018), 9 pgs.

Ronneberger, Olaf, et al., "U-Net Convolutional Networks for Biomedical Image Segmentation", Computer Science Department and BIOSS Centre for Biological Signalling Studies, University of Freiburg, Germany, (May 18, 2015), 234-241.

Ross, W D, et al., "Multi-sensor 3D image fusion and interactive search", Proceedings of the Third International Conference on Information Fusion, vol. 1, (2000), 10-17.

Schmitt, M, et al., "The Sen1-2 Dataset for Deep Learning in SAR-Optical Data Fusion", Commission I, WG I/3. arXiv:1807.01569v1 [cs.CV], [Online], Retrieved from the Internet: <URL: https://arxiv.org/abs/1807.01569>. (2018), 6 pgs.

Wang, Puyang, et al., "Generating High Quality Visible Images from SAR Images Using CNNs", arXiv:1802.10036v1 [cs.CV], [Online]. Retrieved from the Internet: <URL: https://arxiv.org/abs/1802.10036>, (2018), 6 pgs.

Zhou, Tinghui, et al., "Unsupervised Learning of Depth and Ego-Motion form Video", CVPR. arXiv:1704.07813, (2017), 10 pgs.

"International Application Serial No. PCT/US2020/033812, International Search Report dated Aug. 11, 2020", 3 pgs.

"International Application Serial No. PCT/US2020/033812, Written Opinion dated Aug. 11, 2020", 6 pgs.

"International Application Serial No. PCT/US2020/043071, International Search Report dated Nov. 2, 2020", 3 pgs.

"International Application Serial No. PCT/US2020/043071, Written Opinion dated Nov. 2, 2020", 7 pgs.

"International Application Serial No. PCT/US2020/043085, International Search Report dated Nov. 2, 2020", 3 pgs.

"International Application Serial No. PCT/US2020/043085, Written Opinion dated Nov. 2, 2020", 6 pgs.

Andreas, Ley, et al., "Exploiting GAN-Based SAR to Optical Image Transcoding for Improved Classification via Deep Learning", EUSAR, 12th European Conference on Synthetic Aperture Radar, (Jun. 7, 2018), 396-401.

Grohnfeldt, Claas, et al., "A Conditional Generative Adversarial Network to Fuse Sar and Multi spectral Optical Data for Cloud Removal from Sentinel-2 Images", IGARSS IEEE International Geoscience and Remote Sensing Symposium, IEEE, (Jul. 22, 2018), 1726-1729.

Matthias, Limmer, et al., "Infrared Colorization Using Deep Convolutional Neural Networks", (Apr. 8, 2016).

Merkle, Nina, et al., "Exploring the Potential of Conditional Adversarial Networks for Optical and SAR Image Matching", IEEE Journal of Selected Topics in Applied Earth Observations and Remote Sensing, IEEE, USA, vol. 11, No. 6, (Jun. 1, 2018), 1811-1820.

Namil, Kim, et al., "Multispectral Transfer Network: Unsupervised Depth Estimation for All-Day Vision", AAAI Conference on Artificial Intelligence, (Apr. 1, 2018), 6983-6991.

Qayynm, Usman, et al., "Thermal colorization using deep neural network", 15th International Bhurban Conference on Applied Sciences and Technology (IBCAST), IEEE, (Jan. 9, 2018), 325-329.

Quan, Dou, et al., "Using deep neural networks for synthetic aperture radar image registration", IEEE International Geoscience and Remote Sensing Symposium (IGARSS), IEEE, (Jul. 10, 2016), 2799-2802.

Shi, Lei Fu, et al., "Reciprocal Translation between SAR and Optical Remote Sensing Images with Cascaded-Residual Adversarial Networks", Arxiv.org, Cornell University Library, 201 Olin Library Cornell University Ithaca, NY, (Jan. 24, 2019).

Tao, Junyi, et al., "Automatic SAR Simulation Technique for Object Identification in Complex Urban Scenarios", IEEE Journal of Selected Topics in Applied Earth Observations and Remote Sensing, IEEE, USA, vol. 7, No. 3, (Mar. 1, 2014), 994-1003.

Zhou, Tinghui, et al., "Unsupervised Learning of Depth and Ego-Motion from Video", IEEE Conference on Computer Vision and Pattern Recognition (CVPR), IEEE Computer Society, US, (Jul. 21, 2017), 6612-6619.

"U.S. Appl. No. 16/935,646, Non Final Office Action dated Sep. 22, 2021", 16 pgs.

"U.S. Appl. No. 16/935,646, Response filed Dec. 22, 2021 to Non Final Office Action dated Sep. 22, 2021", 7 pgs.

"International Application Serial No. PCT/US2020/043071, International Preliminary Report on Patentability dated Feb. 3, 2022", 9 pgs.

"International Application Serial No. PCT/US2020/043085, International Preliminary Report on Patentability dated Feb. 3, 2022", 8 pgs.

\* cited by examiner

CROSS-MODALITY AUTOMATIC TARGET RECOGNITION

BACKGROUND

Image processing generally uses computer techniques to alter one or more images. Image processing can include classification, feature extraction, multi-scale analysis, pattern recognition, projection, or the like. Image processing can include applying a filter or mask to image data, performing a fast Fourier transform (FFT), padding, an affine transformation, edge detection, outline detection, or the like.

DETAILED DESCRIPTION

Figure 1:
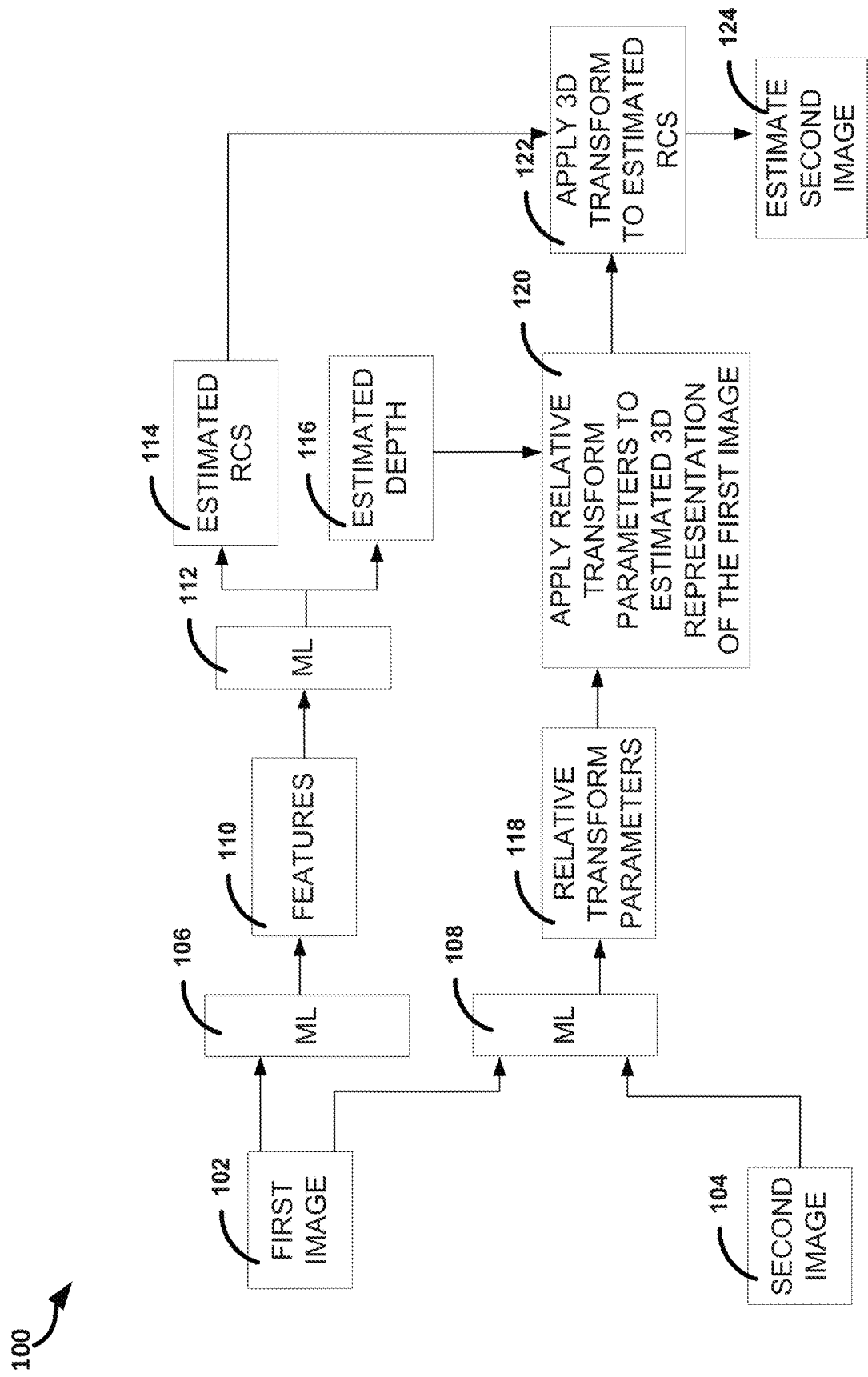
FIG. 1 illustrates, by way of example, a diagram of an embodiment of a system for ML image processing.

Some embodiments relate to automatic target recognition (ATR) using a synthetic aperture radar (SAR), synthetic aperture sonar (SAS), or visible band image. An ML technique can be trained using image pairs, one image of the image pairs can include a visible band image and the other image of the image pairs can include a SAR, SAS, IR, or other non-visible band image. The images can include a same object, such as from a same, different, or substantially similar perspective. A similar or substantially similar perspective can include within about 10 degrees of a same look angle. The non-visible image can have an equal or higher ground sample distance as the visible image. The ML technique can be trained to convert the non-visible band image to a visible band image. A portion of the trained ML technique can be re-purposed for ATR using a non-visible band image. The ATR using a non-visible band image can include using an encoder from the trained ML technique, such as via transfer learning. The ATR can include the encoder and one or more untrained fully connected layers after the encoder. An output of the fully connected layers can include one channel per class. The ATR can be trained using a collection of labeled images. Due to the pre-training of the encoder, this collection of labelled images can be much smaller than what would be necessary otherwise. A cross entropy between a softmax of the final layer and the true labels can serve as an objective function for training the ATR.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The methods or operations may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

The volume of generated imagery produced has far outpaced an ability to analyze and respond to results of the analysis. Analysis of SAR imagery is further confounded by its unfamiliar presentation to the human eye. While machine learning (ML) methods have made significant strides in ATR for visible band imagery, training for SAR requires considerably more training data due to its sensitivity to viewing angle. One approach for training an ML technique for SAR ATR includes augmenting real data with simulations. Based on test performance, simulations have not proven to be capable of effectively replacing real data.

Embodiments can include a generative network to process SAR imagery. A SAR image with unknown object(s) is ingested by a generative network, producing a guess at the visible equivalent, which can be readily interpreted by an image analyst. The network can be trained with matching SAR-visible pairs. The semi-supervised training does not require time-consuming ground truth or manual tagging of imagery.

Embodiments can include employing substantially matching SAR-visible image pairs to build a non-visible image to visible scene encoding latent space. An encoder of the non-visible image to visible image scene can be re-used (via transfer learning) to train a non-visible image ATR (e.g., with limited training data). Non-visible and visible images can be captured from substantially a same position and substantially a same look angle. On the slant axis, a SAR image plane is perpendicular to an electro-optical (EO) image plane. Reconciling the resulting relative distortions can include a 3D reconstruction of objects in the scene. Unlike other convolutional neural network (CNN) hierarchies, the encoder can transition to 3D in order to bridge between the non-visible and visible modalities.

Following the autoencoder concept, the latent space learns to generalize by reproducing the output visible image. The novel element of complimentary focal plane inputs can force the generalization between the non-visible and visible spaces occur in 3D. The learned SAR to 3D process can be invariant to object orientation, thus a rotation sensitivity of SAR can be overcome.

The encoder can be repurposed for ATR. A 3D object, produced based on a non-visible image input, to labelled object function can be easy to learn and requires relatively little training data.

Embodiments can be applied to coincident SAR or SAS and other imagery (e.g., visible band, infrared (IR), light detection and ranging (LIDAR), or the like). Embodiments can estimate three-dimensional (3D) content of the scene. Embodiments can thus estimate a SAR or SAS image based on a visible band image and a perspective for the SAR or SAS image capture point or a visible band image based on a non-visible band image.

A deep network can be trained to estimate approximate RCS and depth (e.g., per pixel). The RCS and depth can be used to reconstruct the visible image. Given a scene center point (SCP) and the first and last position of a radar during the SAR collection (call these points X1 and X2), the slant plane can be derived according to:

$R_1 = X_1 - SCP$ (vector pointing from scene center to first position of radar)

$R_2 = X_2 - SCP$ (vector pointing from scene center to last position of radar)

$\hat{Y} \cong 0.5*(R_1 + R_2)$ (range direction, vector pointing to midpoint of first and last position of radar)

$\hat{Z} = R_1 \times R_2$ (vector pointing perpendicular to slant plane, where "×" is the cross product)

$\hat{X} = \hat{Z} \times \hat{Y}$ (cross range direction vector)

The slant plane is spanned by $\hat{X}$ and $\hat{Y}$ (range). $\hat{Z}$ is a perpendicular vector to the slant plane.

Embodiments can use an approximately orthogonal projection of a reference frame to a second image space. Embodiments can be applicable to platforms with a first image sensor and a second image sensor located on a same platform or otherwise physically close to each other.

Innovations of embodiments can include automatic target recognition (ATR) in a modality other than visible, such as SAR, SAS, infrared, or the like. Embodiments can learn features of an object in a non-visible domain and identify when those features are present in the non-visible images. At inference time, embodiments can estimate 3D content of a scene.

Prior techniques of achieving same or similar results include performing object recognition using visible band images.

FIG. 1 illustrates, by way of example, a diagram of an embodiment of a system 100 for ML image processing. The system 100 as illustrated includes a first image 102 and a second image 104 used as inputs to ML techniques 106, 108. The ML techniques 106, 108 can be different layers of a neural network (NN) or different ML techniques.

The first image 102 can include a visible spectrum image, infrared (IR) image, light detection and ranging (LIDAR), or the like. An example of a visible spectrum image is an electro-optical (EO) image or a frame of a video. A visible spectrum image can be generated using a charge coupled device, or the like, that converts light incident thereon to an electrical signal. A parameter of the electrical signal can indicate an intensity, color, or the like of the light incident thereon.

The second image 104 can include a synthetic aperture radar (SAR) image or a synthetic aperture sonar (SAS) image. SAR uses motion of a radar antenna over a geographical region to provide spatial resolution. A SAR image device is typically situated on an aerial vehicle, such as an aircraft (e.g., an airplane, unmanned aerial vehicle, or the like) or spacecraft (e.g., a satellite, space station, or the like). A distance the SAR device travels over a region in a time it takes for a pulse to return to the antenna creates the "size" of the antenna. A SAR image can be created by a static physical antenna or a smaller moving antenna.

SAS operates in a manner similar to SAR, with SAS using reflected audio waves instead of electromagnetic waves as are used in SAR. A SAS device can be moved while illuminating a same location. Using coherent reorganization of the received sonar waves, an image can be produced.

The ML technique 106, 108, 112 can include or more of an NN, a Bayesian technique, a K-means clustering technique, a Support Vector Machine (SVM) technique, a linear regression technique, a decision tree, a random forest technique, a logistic regression technique, and a nearest neighbor technique, among others. The NNs can include deep learning NNs. The NNs can be hierarchical, in which one layer depends on an output of a previous layer, or parallel, in which a layer can operate independent of an output of another layer. The ML technique 106, 108, 112 can include a same or different ML technique. In some embodiments, one or more of the ML techniques 106, 108, 112 include convolutional NNs (CNNs). The ML technique 106 can identify and generate features 110 of the first image 102. The features 110 are individual measurable properties of the first image 102. The ML technique 106 can transform the first image 102 into a meaningful representation, namely the features 110.

The NNs can include a fully or partially convolutional NN, a deep convolutional network with a dilated convolution, a deep convolutional network with a residual block or densely connected convolutional block, a convolutional architecture with an auto-encoder, a U-Net convolutional architecture (e.g., with a skip connection), or a recurrent convolutional network architecture. A fully convolutional architecture includes an NN composed of convolutional layers without any fully connected layers or a multi-layer perceptron (MLP). A partially convolutional architecture includes an NN in which overall image dimensions decrease nearer an output layer until all features are flattened to a vector. The dimension decrease can be provided using max pooling layer, or the like. It is common to refer to what is called a partially convolutional NN herein as a convolutional NN. A deep convolutional NN is a convolutional NN with more than two NN layers. A dilated convolution integrates a more global context into, for example, object detection or segmentation. In dilated convolutional networks, a dilation factor is greater than one and usually increases linearly or exponentially at each layer for faster growth of the receptive field of the network. A difference between a dilated convolutional NN and a normal convolutional NN is that the dilation factor for a normal convolutional NN is 1. The receptive field is how many pixels have contributed some information to single neuron in a network. Neurons that are in deeper layers of an NN usually have a larger receptive field because a larger section of the input image has been used in the computation of that neuron. A dilated convolutional NN is completely convolutional (unlike max pooling) and allows for just as much, if not more, receptive field growth.

A residual block is a special case of a highway network without any gates in a skip connection. A residual block allows the flow of memory (or information) from initial layers to last layers. A densely connected convolutional block includes connections from each layer to every other layer of the NN. An autoencoder includes encoder and decoder NNs that transform input space to a feature space and back to the input space. An autoencoder may be compressive, if the number of dimensions in the feature space is fewer than the number of input dimensions. Variational autoencoders (VAE), or denoising autoencoders are examples of autoencoders. A modified fully-convolutional UNET architecture is an example of a network segmentation model that may be trained using an autoencoder. Once trained, the encoder network of an autoencoder may be used to transform the received data into the learned feature space of the autoencoder. The transformed data may then be used as input to the ML technique or within the ML technique. A description of U-NET can be found in the publication "U-Net: Convolutional Networks for Biomedical Image Segmentation" by Olaf Ronneberger, Philipp Fischer, and Thomas Brox. A recurrent convolutional NN uses a recurrent architecture with convolutions. The most common way this is done is by using convolutions to extract dense image features, and then recurrently processing the dense features. A less common way to implement a recurrent convolutional NN is to apply recurrent networks to small receptive fields convolutionally across the image.

A CNN is a feed-forward ML technique that is generally used for an image analysis tasks. The CNN accepts pixel values as input and layers carry out feature extraction from the CNN. The CNN can include one or more convolution layers, activation functions (e.g., a rectified linear unit (ReLU) or exponential linear unit (ELU), or the like), or normalization layers (e.g., batch normalization, layer normalization, or group normalization layers), pooling (e.g., max, average, or the like) layers, or the like. A pooling layer can flatten X and Y image dimensions of an image.

In embodiments in which the ML technique 106, 108, 112 includes a CNN, the features 110 can be considered convolutional features. The CNN layer is a sort of convolution filter that is applied to the input to produce the features 110.

The features 110 can be provided to ML technique 112 that provides an estimated RCS 114 or estimated depth 116. The ML technique 112 can be same or different from the ML technique 106, 108. The ML technique 112 can include a fully-convolutional layer (in an example of a CNN). The full-convolutional layer can characterize the features 110 into the estimated RCS 114 or the estimated depth 116.

The estimated RCS 114 of an object can be different and unrelated to a physical cross-sectional area of the object. The RCS is an effective area that scatters incident signals back to the radar receiver isotropically. This is described concisely by a monostatic radar equation:

$$P_r = \frac{P_t G_t}{4\pi r^2} \sigma \frac{A_{eff}}{4\pi r^2}$$

Where $P_t$ is the transmitter input power, $G_t$ is a gain of a transmitter antenna, r is a distance from the radar to the target, σ is the RCS, $A_{eff}$ is the effective area of the radar receiving antenna, and $P_r$ is the power received back from the target by the radar. The first term, $$\frac{P_t G_t}{4\pi r^2},$$

represents the power density of the radar transmitter at the target. The second term, σ, is the RCS, so $$\frac{P_t G_t}{4\pi r^2} \sigma$$

represents power intercepted by the target. The term $$\frac{1}{4\pi r^2}$$

represents spreading (isotropic spreading) of the power from the target back to the receiver. The receiver collects the power density with effective area, $A_{eff}$.

RCS can be affected by one or more of many factors, such as size of the target, material of the target, absorption properties of the target, shape and orientation of the target, or the like. In effect, the ML techniques 106, 112 can model these properties of a target based on the first image 102. The ML techniques 106, 112 can determine the RCS 114 based on the determined properties. In mathematical terms, RCS can be determined a $$\sigma = \lim_{r \to \infty} 4\pi r^2 |E_s|^2/|E_i|^2$$

Where $E_s$ is the far field scattered electric field intensity and $E_i$ is the far field incident electric field intensity. In some embodiments, the ML techniques 106, 112 can model $E_s$ and $E_i$ based on the first image 102.

The ML technique 108 receives the first image 102 and the second image 104. The ML technique 108 determines relative transform parameters between the first image 102 and the second image 104. The transform parameters 118 can include a rotation, translation or scaling (e.g., of intensity, brightness, contrast, or the like), or the like. The transform parameters 118 can be learned such that a pixel in the image 102 corresponds to a pixel in the image 104 after a transform in accord with the transform parameters is applied thereto. The ML technique 108 can include a deep convolutional network that maps image pairs to a vector of much smaller dimension (for example 6, which corresponds to rotational and translation imaging sensor pose difference in three dimensions). Examples include convolutional residual networks or densely-connected convolutional networks.

The ML technique 108 can include a deep dense network. In a deep dense network (sometimes called a fully-connected network) a fully connected or dense layer performs a linear operation in which every input is connected to output by a weight. A dense residual network includes a skip connection to jump over some layers. One or more of the ML techniques 106, 108, 112 can be a component of a spatial transformer network. The operation 122 can include a differential image resampling procedure initially used in spatial transformer networks.

At operation 120, the estimated relative transform parameters 118 are applied to an estimated 3D representation of the first image 102. The 3D representation is a combination of the first image 102 and the estimated depth 116 determined by the ML technique 112. The relative transform parameters 118 determined by the ML technique 108 can be applied to this 3D representation.

The parameters can be for a general image projection. The ML technique 108 can learn both extrinsic and intrinsic imaging parameters. An example of an extrinsic parameter includes sensor pose with respect to the scene. An example of an intrinsic parameter includes a camera parameter, such as focal length.

At operation 122, the RCS 114 from the ML technique 112 and the transformed output from the operation 120 are combined to generate an estimated second image 124. A difference between the estimated second image 124 and the second image 104 can define feedback, such as to train the ML technique 106, 108, 112.

Figure 2:
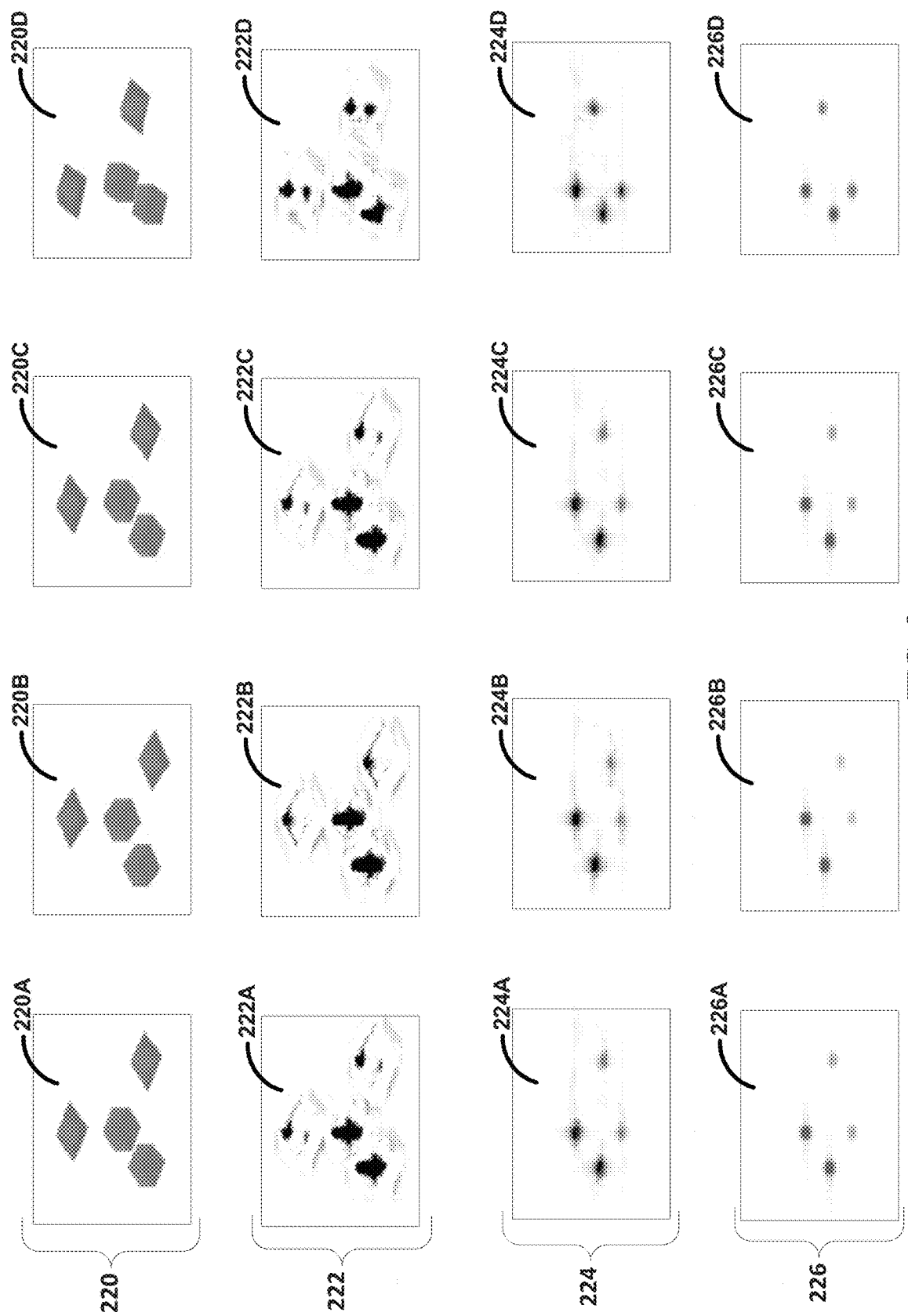
FIG. 2 illustrates, by way of example a diagram of an embodiment of instances of inputs and outputs of the system.

FIG. 2 illustrates, by way of example a diagram of an embodiment of instances of inputs and outputs of the system 100. The input and outputs include an input image 220, an estimated RCS 222, another estimated RCS 224 that provides a view of the estimated RCS 222 transformed to an image space of a true second image 226. The input image 220 is an example of the first image 102. The true second image 226 is an example of the second image 104. The estimated RCS 222 is an output of the ML technique 112. The estimated RCS 224 transformed to the second image space is an example of output of the operation 124. The system 100 can be used to generate a SAR or SAS image based on just the first image 102, after the ML techniques 106, 108, 112 are trained.

Using the system 100, estimated RCS 222A, 222B, 222C, 222D can be determined based on the input image 220A, 220B, 220C, 220D, respectively. The estimated RCS 222A-222D can be projected to a space that is different from the space of the input image 220A-220D, such as a space of a true second image 226A, 226B, 226C, 226D. The result of the projection can be another estimated RCS 224A, 224B, 224C, 224D. The true second image 226A, 226B, 226C, 226D is provided to show how close the estimated RCS 224A, 224B, 224C, 224D estimates a target (the true second image 226A, 226B, 226C, 226D in this example).

A first image 220 can be converted to a different type of image using the system 100. Two images 220, 226 can be registered to each other using the system 100. The transform between the two image spaces can be learned and applied to one of the images 102, 104 to register one image to the other.

Figure 3:
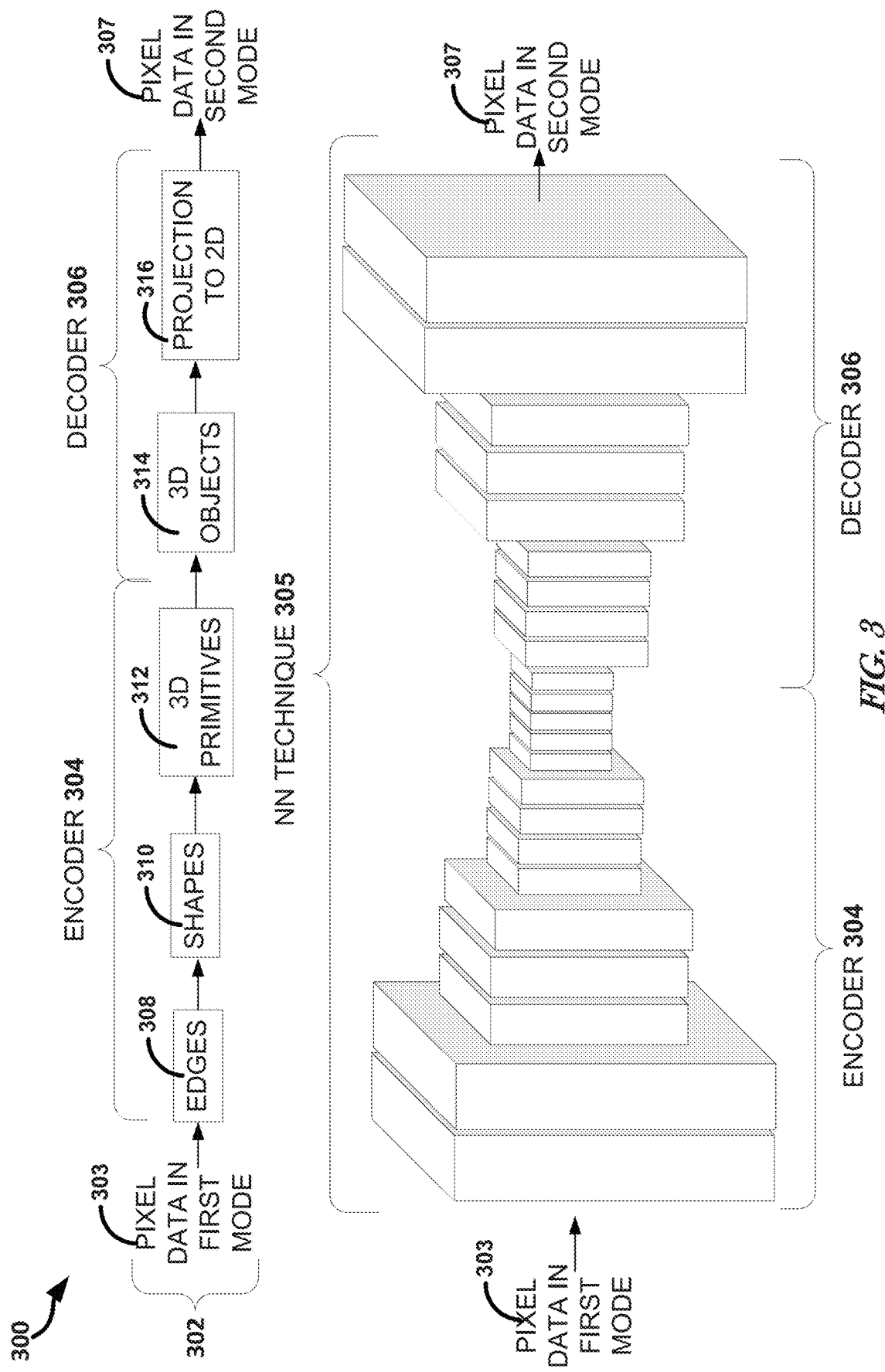
FIG. 3 illustrates, by way of example, a flow diagram of an embodiment of a technique for converting image data of a first mode to image data of a second, different mode.

FIG. 3 illustrates, by way of example, a flow diagram of an embodiment of a technique 300 for converting image data of a first mode to image data of a second, different mode. The technique 300 can be performed by the system 100. The first mode includes SAR, SAS, infrared, or other non-visible mode of imagery. The second mode is a visible mode of imagery for which ATR can be performed by an ML technique or human. The technique 300 is illustrated in a few conceptual ways. The first way includes operations 302 performed by an ML technique in a block diagram form. The second includes an NN technique 305 configured to implement the operations 302. The operations 302 and NN technique 305 include operations of an encoder 304 and a decoder 306.

The operations 302 include extracting edges of pixel data in a first mode 303 at operation 308. Edges define the boundaries between objects in images. Edges are typically identified using discontinuities in brightness. NNs and other ML techniques are generally very good at extracting edges. Some edge detection techniques are gradient based, and some are Gaussian based. Gradient based techniques include a Sobel operator, a Prewitt operator, and a Robert's operator. Gaussian based techniques include Canny edge detection and Laplacian of Gaussian.

The edges identified at operation 308 can be used to estimate basic shapes at operation 310. Basic shapes can include polygons, circles, ellipses, irregular shapes, 3D versions thereof, or the like. The basic shapes identified at operation 310 can be used to generate 3D primitives at operation 312. The 3D primitives define outlines of objects in the image data. The operations 308, 310, and 312 are performed by the encoder 304. The encoder 304 ingests pixel data in a first mode 303 and generates 3D primitives of objects in the pixel data in the first mode 303.

The 3D primitives identified at operation 312 can be correlated to 3D objects at operations 314. The identified objects be projected back to a two-dimensional (2D) representation at operation 316. The 2D representation is of the pixel data in a second mode 307. The operations 314, 316 can be performed by the decoder 306. In general, the decoder ingests 3D primitives of the pixel data and converts it to 2D pixel data in a specified mode, such as a visible mode. Note that in converting between modes, the operations 302 are encoding pixel data in the first mode 303 into 3D primitives at operation 312. These 3D primitives of objects identified at operation 312 can be used for object detection (classification) as is described regarding FIG. 4.

Figure 4:
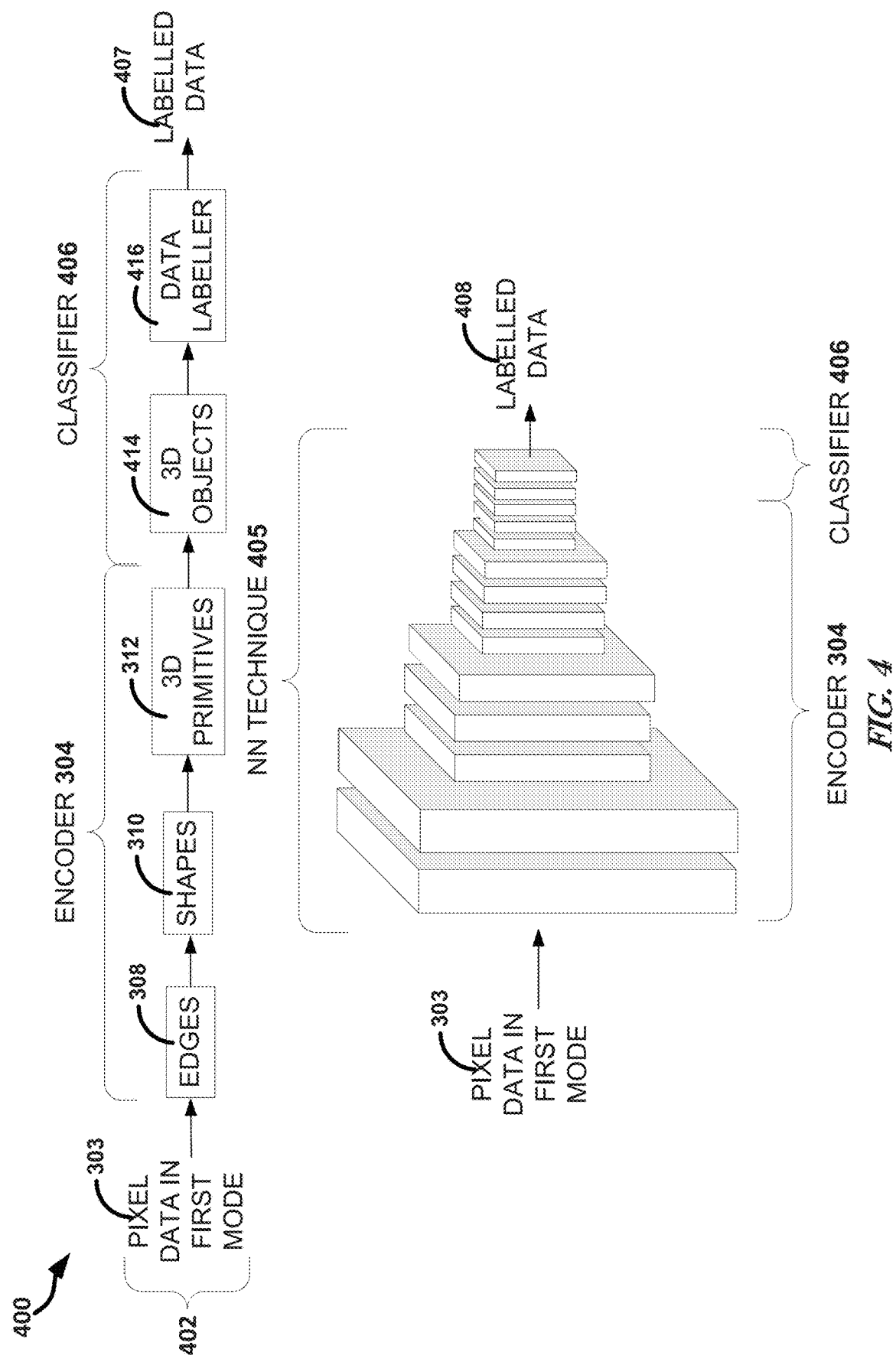
FIG. 4 illustrates, by way of example, a flow diagram of an embodiment of a technique for ATR on image data of a first mode.

The operations 302 can be performed by the NN technique 305. The NN technique 305 can include a generative network to process SAR or other non-visible imagery. The imagery can include unknown object(s). The imagery (pixel data in a first mode 303) can be ingested by the NN technique 305. The NN technique 305 can produce a visible image equivalent (pixel data in a second mode 307) to the non-visible imagery that was ingested. The visible imagery can be readily interpreted by an image analyst (e.g., a human or ML ATR technique). The NN technique 305 can be trained with a generative adversarial network (GAN). The training can include feeding image pairs into the NN technique 305. The image pairs can include images in the first mode and images in the second mode of a same or similar scene, such as to include a same object in both imagery. The unsupervised training does not require time-consuming ground truth or manual tagging of imagery. The encoder 304 of the NN technique 305 can be repurposed to train an ATR with limited labelled data as illustrated in FIG. 4. The trained ATR can operate on the pixel data in the first mode 303 (without need for the pixel data in the second mode 307) and classify objects present in the pixel data.

FIG. 4 illustrates, by way of example, a flow diagram of an embodiment of a technique 400 for ATR on image data of a first mode. The technique 400 can be performed using a portion of the system 100, the NN technique 305, the encoder 304, a combination thereof, or the like. The first mode includes SAR, SAS, infrared, or other non-visible mode of imagery. The technique 400 is illustrated in a few conceptual ways. The first way includes operations 402 performed by an ML technique in a block diagram form. The second includes an NN technique 405 configured to implement the operations 402. The operations 402 and NN technique 405 include operations of the encoder 304 and a classifier 406.

The operations 308, 310, 312 are operations of the encoder 304 and described regarding FIG. 3. The 3D primitives of objects identified at operation 312 can be used for object detection (classification). The operations 402 can be performed by the NN technique 405. The NN technique 405 can include a generative network to process SAR or other non-visible imagery. The imagery can include unknown object(s). The imagery (pixel data in a first mode 303) can be ingested by the NN technique 405. The NN technique 405 can produce labelled data 408 (a classification of objects in the ingested imagery). The NN technique 405 can be trained using an unsupervised ML training technique.

The training can include feeding image pairs into the NN technique 305. The image pairs can include images in the first mode and images in the second mode of a same or similar scene, such as to include a same object in both imagery. The unsupervised training does not require time-consuming ground truth or manual tagging of imagery. The encoder 304 of the NN technique 405 can be repurposed from the NN technique 305. The trained ATR can operate on the pixel data in the first mode 303 (without need for the pixel data in the second mode 307) and classify objects present in the pixel data.

In a GAN, there are two network, a generative network and a discriminator network. The discriminator network (usually a standard convolutional neural network) tries to classify whether an image is fake (generated by the NN) or real (generated based on optical sensor data). The generated image can be the image in the second mode. The discriminator network can be initially trained in a supervised manner. This supervised training can include providing a number of fake images and a number of real images, respectively labelled. The generative network can learn how to generate images that the discriminator network classifies as real. After training, the generator is creating images that the discriminator classifies as real. Said another way, the real images and the fake images have corresponding distributions. The discriminator network determines whether the image input is from the real image distribution or the fake image distribution.

A variation on a generative network can include a variational autoencoder (VAE). A VAE maximizes a lower bound on a log likelihood of the data. Another variation is an autoregressive model, such as PixelRNN. The autoregressive model is trained to model a conditional probability distribution of every individual pixel given pixels (above and to the side).

The classifier 406 can include a neuron for each possible label to be applied to the imagery. The neurons apply a function (e.g., a logistic regression function) to input from a previous layer. In terms of the operations 402, the classifier 406 determines a most appropriate label for the 3D objects identified at operation 414.

Figure 5:
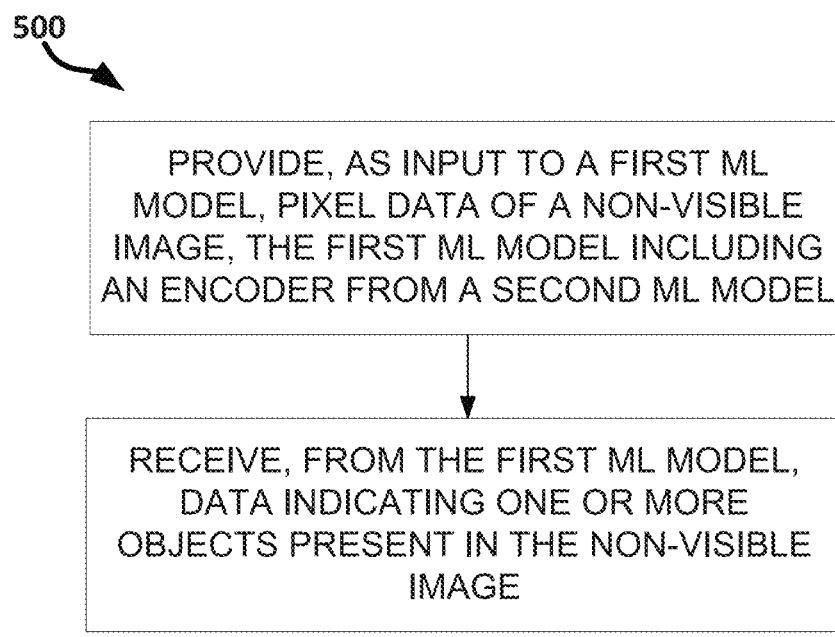
FIG. 5 illustrates, by way of example, a diagram of an embodiment of a method for image processing.

FIG. 5 illustrates, by way of example, a diagram of an embodiment of a method 500 for image processing. The method 500 as illustrated includes providing, as input to the first ML model, pixel data of a non-visible image, the first ML model including an encoder from a second ML model, at operation 502. The second ML model can be trained to generate a visible image representation of an input non-visible image. The method 500 as illustrated further includes receiving, from the first ML model, data indicating one or more objects present in the non-visible image, at operation 504.

The method 500 can further include, wherein the non-visible image is a synthetic aperture radar, synthetic aperture sonar, or infrared image. The method 500 can further include, wherein the second ML model is a generative adversarial network trained using image pairs, each of the image pairs including a first image of a first non-visible modality and a second image of a second visible modality. The method 500 can further include, wherein the first image and the second image are captured from substantially a same perspective. The method 500 can further include, wherein the encoder encodes the first image into a visible latent space.

The method 500 can further include, wherein the first ML model further includes a classifier to label the outlines of the identified objects. The method 500 can further include, wherein the first ML model is trained using a supervised or semi-supervised technique.

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 6:
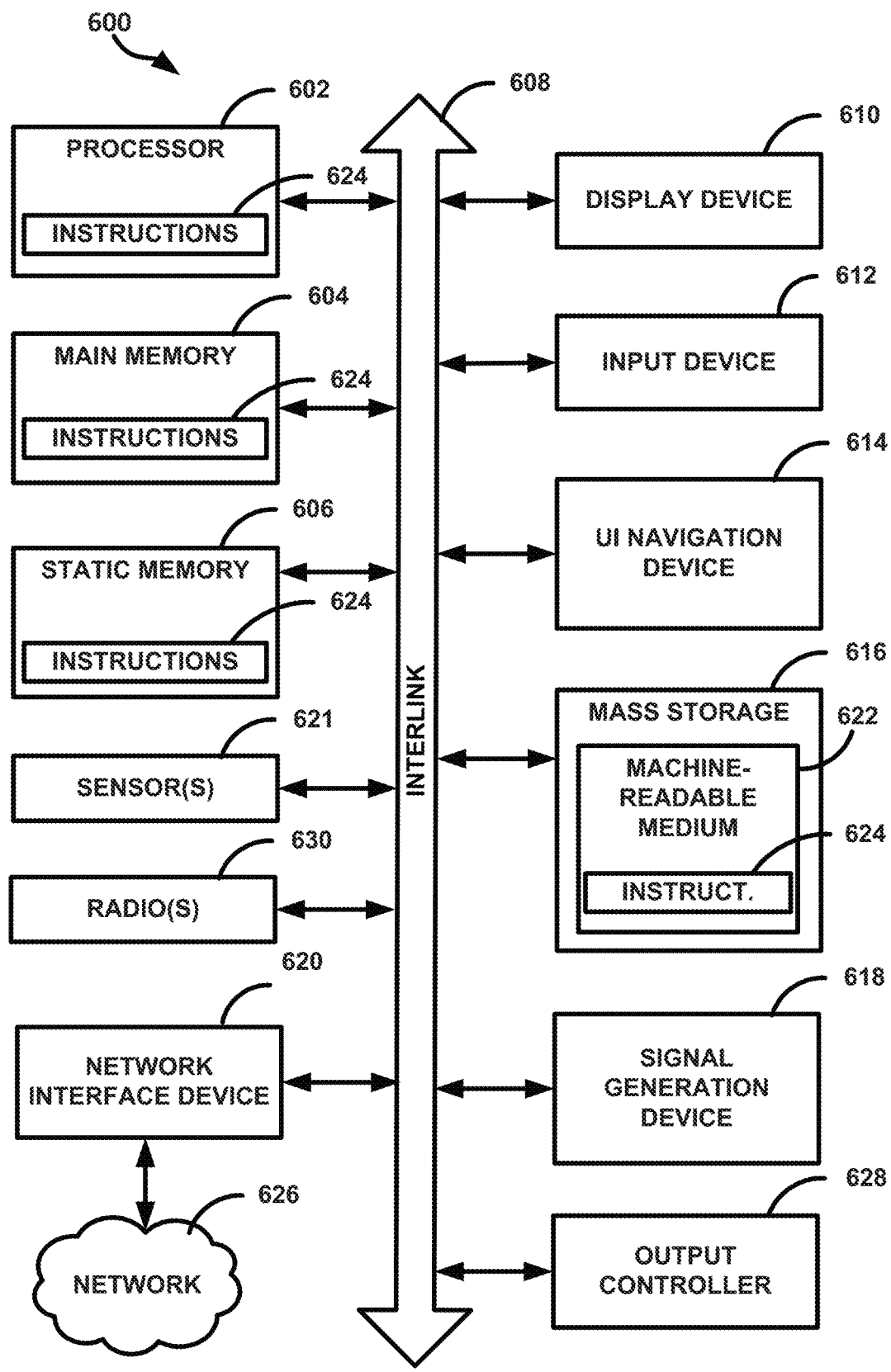
FIG. 6 illustrates, by way of example, a block diagram of an embodiment of a machine in the example form of a computer system within which instructions, for causing the machine to perform any one or more of the methodologies discussed herein, may be executed.

FIG. 6 illustrates, by way of example, a block diagram of an embodiment of a machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), a network interface device 620, and radios 630 such as Bluetooth, WWAN, WLAN, and NFC, permitting the application of security controls on such protocols.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional notes and some illustrative Examples.

Example 1 includes a system for image processing, the system comprising a memory to store parameters defining a first machine learning (ML) model for object classification, and processing circuitry to provide, as input to the first ML model, pixel data of a non-visible image, the first ML model including an encoder from a second ML model, the second ML model trained to generate a visible image representation of an input non-visible image, and receive, from the first ML model, data indicating one or more objects present in the non-visible image.

In Example 2, Example 1 further includes, wherein the non-visible image is a synthetic aperture radar, synthetic aperture sonar, or infrared image.

In Example 3, at least one of Examples 1-2 further includes, wherein the second ML model is a generative adversarial network trained using image pairs, each of the image pairs including a first image of a first non-visible modality and a second image of a second visible modality.

In Example 4, Example 3 further includes, wherein the first image and the second image are captured from substantially a same perspective.

In Example 5, at least one of Examples 1-4 further includes, wherein the encoder encodes the first image into a visible latent space.

In Example 6, Example 5 further includes, wherein the first ML model further includes a classifier to label the outlines of the identified objects.

In Example 7, Example 6 further includes, wherein the first ML model is trained using a supervised or semi-supervised technique.

Example 8 includes a method of performing operations of the processing circuitry of at least one of Examples 1-7.

Example 9 includes a non-transitory machine-readable medium including instructions that, when executed by a machine, cause the machine to perform operations of the processing circuitry of at least one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for image processing, the system comprising:
   a memory to store first parameters defining a first machine learning (ML) model and second parameters defining a second ML model; and
   processing circuitry to:
   train the second ML model, based on visible and non-visible image pairs of respective overlapping geographic regions, to generate the visible image of an image pair of the image pairs based on the non-visible image of the image pair resulting in a trained second ML model;
   use a trained encoder of the trained second ML model as an encoder of the first ML model;
   train the first ML model, including the encoder, based on a collection of labelled images;
   provide, as input to the first ML model, pixel data of a non-visible image of a geographic region; and
   receive, from the first ML model, data indicating one or more objects present in the non-visible image.

2. The system of claim 1, wherein the non-visible image is a synthetic aperture radar, synthetic aperture sonar, or infrared image.

3. The system of claim 1, wherein the second ML model is a generative adversarial network trained using image pairs, each of the image pairs including a first image of a first non-visible modality and a second image of a second visible modality.

4. The system of claim 3, wherein the first image and the second image are captured from substantially a same perspective.

5. The system of claim 1, wherein the encoder encodes the first image into a visible latent space.

6. The system of claim 5, wherein the first ML model further includes a classifier to label the outlines of the identified objects.

7. The system of claim 6, wherein the first ML model is trained using a supervised or semi-supervised technique.

8. A method for image processing comprising:
   training, to generate an encoder for a first machine learning (ML) model, a second ML model, the second ML model trained based on visible and non-visible image pairs of respective overlapping geographic regions and to generate the visible image of an image pair of the image pairs based on the non-visible image of the image pair resulting in a trained second ML model;
   using a trained encoder of the trained second ML model as the encoder of the first ML model;
   training the first ML model, including the encoder, based on a collection of labelled images;
   providing, as input to the first ML model, pixel data of a non-visible image of a geographic region; and
   receiving, from the first ML model, data indicating one or more objects present in the non-visible image.

9. The method of claim 8, wherein the non-visible image is a synthetic aperture radar, synthetic aperture sonar, or infrared image.

10. The method of claim 8, wherein the second ML model is a generative adversarial network trained using image pairs, each of the image pairs including a first image of a first non-visible modality and a second image of a second visible modality.

11. The method of claim 10, wherein the first image and the second image are captured from substantially a same perspective.

12. The method of claim 8, wherein the encoder encodes the first image into a visible latent space.

13. The method of claim 12, wherein the first ML model further includes a classifier to label the outlines of the identified objects.

14. The method of claim 13, wherein the first ML model is trained using a supervised or semi-supervised technique.

15. A non-transitory machine-readable medium including instructions that, when executed by a machine, cause the machine to perform operations comprising:
   training, to generate an encoder for a first machine learning (ML) model, a second ML model, the second ML model trained based on visible and non-visible image pairs of respective overlapping geographic regions and to generate the visible image of an image pair of the image pairs based on the non-visible image of the image pair resulting in a trained second ML model;
   using a trained encoder of the trained second ML model as the encoder of the first ML model;
   training the first ML model, including the encoder, based on a collection of labelled images;
   providing, as input to the first ML model, pixel data of a non-visible image of a geographic region; and
   receiving, from the first ML model, data indicating one or more objects present in the non-visible image.

16. The non-transitory machine-readable medium of claim 15, wherein the non-visible image is a synthetic aperture radar, synthetic aperture sonar, or infrared image.

17. The non-transitory machine-readable medium of claim 15, wherein the second ML model is a generative adversarial network trained using image pairs, each of the image pairs including a first image of a first non-visible modality and a second image of a second visible modality.

18. The non-transitory machine-readable medium of claim 17, wherein the first image and the second image are captured from substantially a same perspective.

19. The non-transitory machine-readable medium of claim 15, wherein the encoder encodes the first image into a visible latent space.

20. The non-transitory machine-readable medium of claim 19, wherein the first ML model further includes a classifier to label the outlines of the identified objects.

* * * * *